US 6,636,497 B1

(12) United States Patent
Honkasalo et al.

(10) Patent No.: US 6,636,497 B1
(45) Date of Patent: Oct. 21, 2003

(54) AIR INTERFACE CAPACITY SCHEDULING METHOD

(75) Inventors: Zhi-Chun Honkasalo, Kauniainen (FI); Janne Salonen, Oulu (FI)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/627,328

(22) PCT Filed: Nov. 30, 1998

(86) PCT No.: PCT/FI98/00933

§ 371 (c)(1),
(2), (4) Date: Jul. 27, 2000

(87) PCT Pub. No.: WO00/33589

PCT Pub. Date: Jun. 8, 2000

(51) Int. Cl.[7] ............................................... H04B 7/216
(52) U.S. Cl. .................. 370/335; 370/465; 370/468; 370/493; 370/485; 370/490
(58) Field of Search ................. 370/465, 468, 370/493, 485, 490, 335

(56) References Cited

U.S. PATENT DOCUMENTS

| | | | | |
|---|---|---|---|---|
| 4,829,569 A | * | 5/1989 | Seth-Smith et al. | 380/234 |
| 5,400,401 A | | 3/1995 | Wasilewski et al. | |
| 5,638,371 A | | 6/1997 | Raychaudhuri et al. | |
| 5,790,534 A | * | 8/1998 | Kokko et al. | 370/335 |
| 5,831,984 A | * | 11/1998 | Hottinen | 370/441 |
| 6,141,353 A | * | 10/2000 | Li | 370/465 |
| 6,324,172 B1 | * | 11/2001 | Pankaj | 370/342 |
| 6,466,586 B1 | * | 10/2002 | Darveau et al. | 370/468 |

FOREIGN PATENT DOCUMENTS

| | | | |
|---|---|---|---|
| DE | 1050989 A2 | * | 11/2000 |
| FI | WO 9613909 | * | 5/1996 |
| WO | WO 99/13600 | | 3/1999 |
| WO | WO 99/11093 | | 4/1999 |

* cited by examiner

Primary Examiner—Dwayne Bost
Assistant Examiner—Sujatha Sharma
(74) Attorney, Agent, or Firm—Pillsbury Winthrop LLP

(57) ABSTRACT

A method, and a radio transmitter using the method, is disclosed for scheduling air interface capacity between user services in a radio system. The method includes defining a nominal service bit rate, a nominal capacity of the service, and an effective coding rate of the service, and scheduling air interface frame capacity between at least two different services. The scheduling includes computing the bit rate of a first service by multiplying the nominal capacity of the first service by the effective coding rate of the first service, and adding to this normal bit rate of the first service borrowed extra capacity of at least one other service, the bit rate obtained from the extra capacity computed by multiplying a predetermined amount of the nominal capacity of the other service by the effective coding rate of the first service.

28 Claims, 11 Drawing Sheets

AIR INTERFACE CAPACITY SCHEDULING METHOD

FIELD OF THE INVENTION

The invention relates to a radio system, more particularly to a method of scheduling air interface capacity between different user services.

BACKGROUND OF THE INVENTION

One of the major problems in mobile telephone systems is limited radio capacity. In current systems, a certain amount of radio capacity is reserved for each user having a circuit switched connection for the entire duration of a connection. In packet switched transmission, where the data transferred is typically generated in bursts, it is a waste of radio capacity to keep radio capacity reserved according to the highest momentarily needed transmission capacity. Different kinds of methods have therefore been developed for flexible allocation of radio capacity.

A new problem is that a single user may use simultaneously several different services. A certain amount of total capacity to be used for data transmission is then reserved for the user. The user also wants to use the capacity he is paying for as efficiently as possible.

Several such services exist simultaneously and the system has to be efficient in supporting diverse combinations of services. In third generation mobile telephone systems, a wide variety of services and service combinations are available. As these services have variable rates and the maximum instantaneous bit rate of each service may occur rarely, it is not efficient to allocate capacity based on the worst service bit rate combination, i.e. every service transmitting at the highest possible bit rate. On the other hand, a sudden need for more capacity may arise for some service, in which case the system should be able to borrow extra capacity very quickly. As a system option, a user equipment (UE) having multiple bearer services can be managed as one single radio link connection, where radio capacity is allocated for the whole link. Internally, UE has the task of managing the scheduling of multiple bearer transmission. This should reduce the resource management task in the network and it also reduces scheduling delay as it is now carried out internally by the UE. However, if multiple bearer services have different QoS (Quality of Service), e.g. different level of error protection by channel coding, this leads to a problem that the radio resource used to transmit one information bit of one bearer does not equal to the resource used to transmit one information bit of another bearer.

BRIEF DESCRIPTION OF THE INVENTION

An object of the invention is therefore to provide a method and an equipment implementing the method in such a way that the above problems can be solved. This is achieved with the method described below, which is a method of scheduling air interface capacity between user services in a radio system, comprising: defining a nominal service bit rate as a bit rate before channel coding and service specific rate matching; defining a nominal capacity of the service as a bit rate after channel coding and service specific rate matching; defining an effective coding rate of the service by dividing the nominal service bit rate by the nominal capacity of the service. The method also comprises scheduling air interface frame capacity between at least two different services: computing the bit rate of the first service by multiplying the nominal capacity of the first service by the effective coding rate of the first service, and adding to this normal bit rate of the first service the borrowed extra capacity of at least one other service, and the bit rate obtained from the extra capacity is computed by multiplying a predetermined amount of the nominal capacity of the other service by the effective coding rate of the first service.

The invention also relates to an other method of scheduling air interface capacity between user services in a radio system, comprising: defining a nominal service bit rate as a bit rate before channel coding; defining a nominal capacity of the service as a bit rate after channel coding; defining an effective coding rate of the service by dividing the nominal service bit rate by the nominal capacity of the service. The other method also comprises scheduling air interface frame capacity between at least two different services: computing the bit rate of the first service by multiplying the nominal capacity of the first service by the effective coding rate of the first service, and adding to this normal bit rate of the first service the borrowed extra capacity of at least one other service, and the bit rate obtained from the extra capacity is computed by multiplying a predetermined amount of the nominal capacity of the other service by the effective coding rate of the first service.

The invention also relates to a radio transmitter for transmitting information of at least two different user services, comprising: a channel coder in each service information branch for coding the information; a rate matcher connected to the output of the channel coder in each service information branch for performing service specific rate matching for the information; means for defining a nominal service bit rate as a bit rate before channel coding and service specific rate matching, means for defining a nominal capacity for the service as a bit rate after channel coding and service specific rate matching; means for defining an effective coding rate for the service by dividing the nominal service bit rate by the nominal capacity of the service. The radio transmitter also comprises means for scheduling air interface frame capacity between at least two different services, including: means for computing the bit rate of the first service by multiplying the nominal capacity of the first service by the effective coding rate of the first service, and means for adding to this normal bit rate of the first service the borrowed extra capacity of at least one other service, and the bit rate obtained from the extra capacity is computed by multiplying a predetermined amount of the nominal capacity of the other service by the effective coding rate of the first service.

The invention also relates to an other radio transmitter for transmitting information of at least two different user services, comprising: a channel coder in each service information branch for coding the information; means for defining a nominal service bit rate as a bit rate before channel coding; means for defining a nominal capacity for the service as a bit rate after channel coding; means for defining an effective coding rate for the service by dividing the nominal service bit rate by the nominal capacity of the service. The other radio transmitter also comprises means for scheduling air interface frame capacity between at least two different services, including: means for computing the bit rate of the first service by multiplying the nominal capacity of the first service by the effective coding rate of the first service, and means for adding to this normal bit rate of the first service the borrowed extra capacity of at least one other service, and the bit rate obtained from the extra capacity is computed by multiplying a predetermined amount of the nominal capacity of the other service by the effective coding rate of the first service.

The invention is based on the presentation of a simple and fast reallocation algorithm, wherein the usable bit rate for the service bits is calculated using the nominal capacity of the service, the coding rate, and the borrowed capacity of at least one other service.

The method and system of the invention provide several advantages. Flexibility of the system is improved so that the aggregate capacity allocated for the user services can be easily scheduled dynamically between services according to the need and the service priority, even for each air interface frame separately. The radio capacity of the system will therefore be more fully utilized.

BRIEF DESCRIPTION OF THE DRAWINGS

In the following the invention will be described in greater detail in connection with preferred embodiments and with reference to the attached drawings, in which.

DETAILED DESCRIPTION OF THE INVENTION

The present invention can be used in different mobile telephone systems. In the following examples, the use of invention is described in the Universal Mobile Telephone System (UMTS) using the direct-sequence wide-band code division multiple access (WCDMA), the invention not being, however, restricted to it. The new Japanese mobile telephone system as specified by the ARIB (The Association of Radio Industries and Businesses), for example, is therefore also a mobile telephone system according to the invention.

Figure 1A:
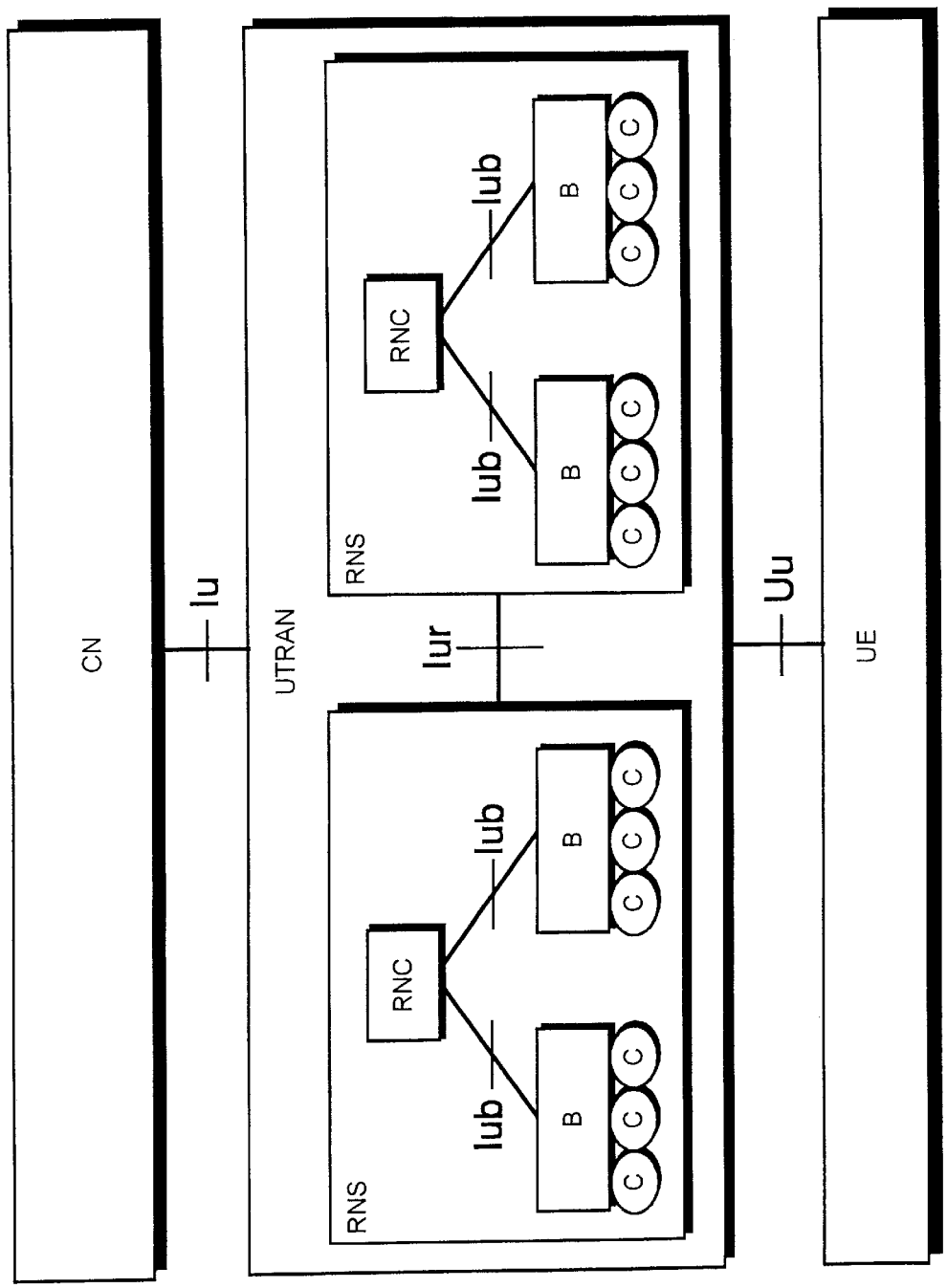
FIGS. 1A and 1B illustrate an example of a mobile telephone system.
Figure 1B:
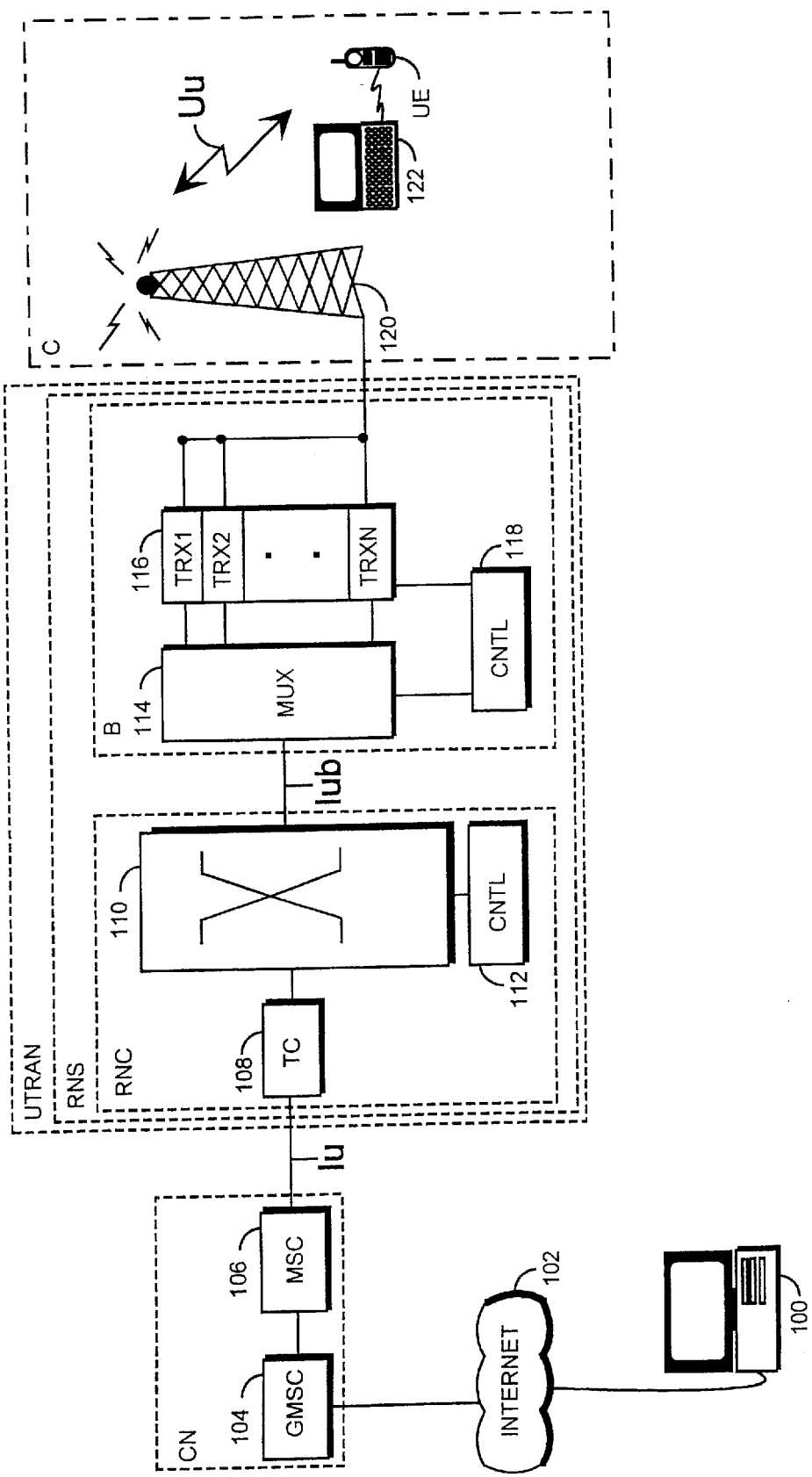

With reference to FIGS. 1A and 1B, a typical mobile telephone system structure will be described. FIG. 1B only comprises the blocks that are essential for the description of the invention, although it is apparent to a person skilled in the art that a common mobile telephone system also comprises other functions and structures which need not be discussed in greater detail here. The main parts of the mobile telephone system are: a core network CN, a UMTS terrestrial radio access network UTRAN, and a user equipment UE. The interface between the CN and the UTRAN is called the Iu interface, and the interface between the UTRAN and the UE is called the Uu interface.

The UTRAN is composed of radio network subsystems RNS. The interface between two RNSs is called the Iub interface. The RNS is composed of a radio network controller RNC and one or more node Bs B. The interface between the RNC and the node B is called the Iub interface. The reception area of the node B, i.e. cell, is denoted in FIG. 1A with a C.

As the presentation in FIG. 1A is very abstract, it is clarified in FIG. 1B by setting forth the parts of the GSM system that correspond with the parts of the UMTS. It is clear that the presented mapping is by no means a binding one but an approximation, because the responsibilities and functions of the parts of the UMTS are still under heavy planning.

FIG. 1B illustrates a packet switched transmission via Internet 102 from a computer 100 connected with the mobile telephone system to a portable computer 122 connected with an user equipment UE. The user equipment UE may be a fixedly mounted wireless local loop terminal, a vehicle-mounted terminal or a handheld portable terminal, for example.

The infrastructure of the radio network UTRAN is composed of radio network subsystems RNS, i.e. base station subsystems. The radio network subsystem RNS is composed of a radio network controller RNC, i.e. a base station controller, and at least one node B, i.e. a base station, under the control of the RNC.

The base station B comprises a multiplexer 114, transceivers 116, and a control unit 118 which controls the operation of the transceivers 116 and the multiplexer 114. The multiplexer 114 arranges the traffic and control channels used by a plurality of transceivers 116 to a single transmission connection Iub.

The transceivers 116 of the base station B have a connection to an antenna unit 120 which is used for providing a bi-directional (or sometimes one-way) radio connection Uu to a user equipment UE. The structure of the frames transmitted in the radio connection Uu is determined in detail and the connection is referred to as an air interface.

The base station controller RNC comprises a group switching field 110 and a control unit 112. The group switching field 110 is used for switching speech and data and for connecting signaling circuits. The base station B and the base station controller RNC form a base station subsystem which additionally comprises a transcoder, also known as a speech codec, or TRAU (Transcoder and Rate Adapter Unit) 108.

The division of functions and the physical structures of the base station controller RNC and the base station B may differ according to the actual realization of the base station subsystem. Typically, the base station B implements the radio connection. The base station controller RNC typically manages the following: radio resource control, inter-cell handover control, power control, timing and synchronization, and paging of user equipment.

The transcoder 108 is usually located as close to a mobile switching center 106 as possible because this allows speech to be transmitted between the transcoder 108 and the base station controller RNC in a cellular radio network form, which saves transmission capacity.

The transcoder 108 converts different digital speech coding modes used between a public switched telephone network and a cellular radio network, to make them compatible, for instance from the 64 kbit/s fixed network form to another form (such as 13 kbit/s) of the cellular radio network, and vice versa. Naturally, the transcoding is carried out only for speech. The control unit 112 carries out call control, mobility management, collection of statistical data and signaling.

The core network CN is composed of the infrastructure belonging to the mobile telephone system not being part of the UTRAN. FIG. 1B illustrates two equipments, which are part of the core network CN, namely a mobile switching center 106, and a gateway mobile switching center 104, which handles mobile telephone systems interfaces towards the outside world, in this example towards the Internet 102.

Figure 5:
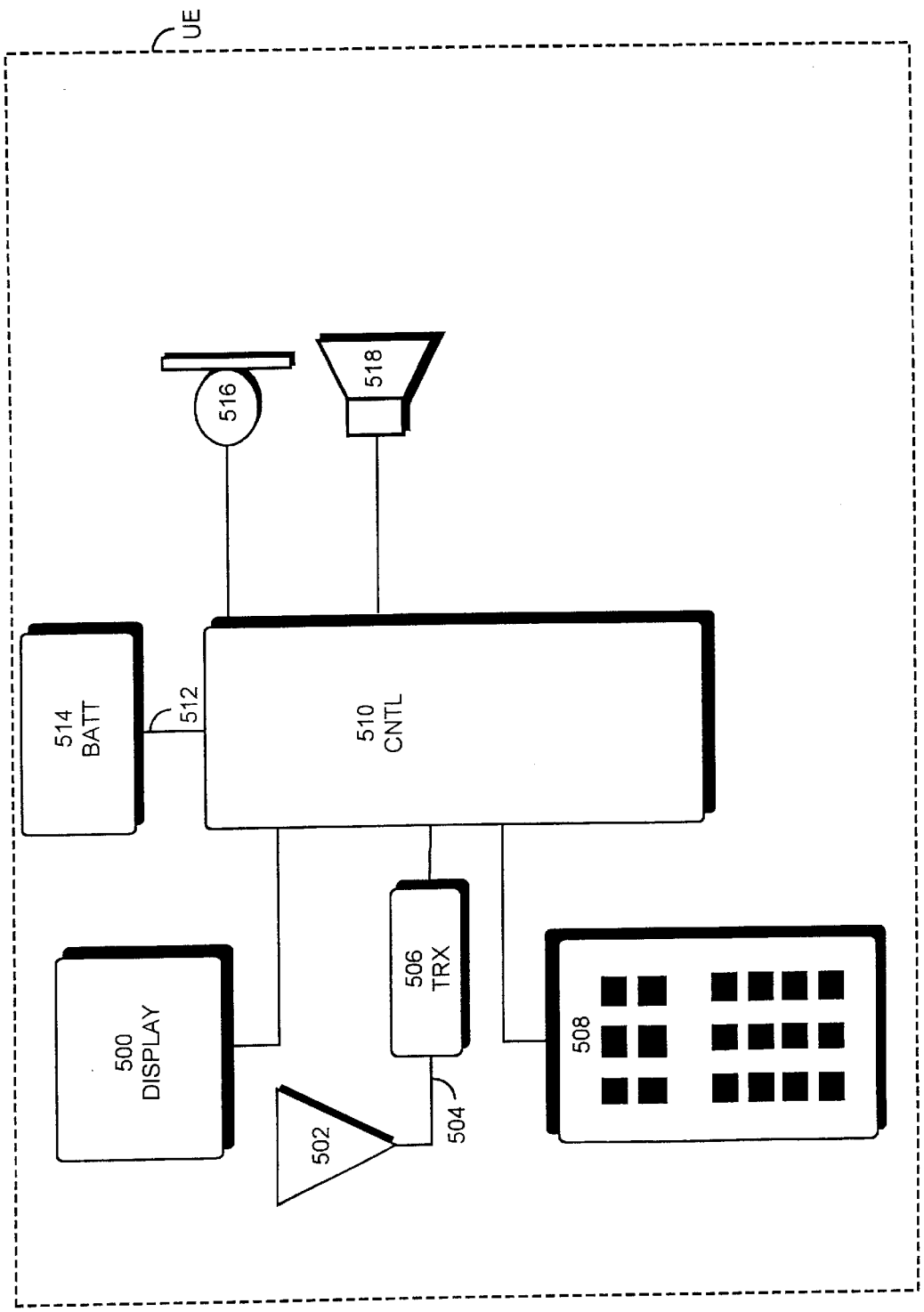
FIG. 5 illustrates a mobile station

FIG. 5 illustrates an exemplary structure of the user equipment UE. The essential parts of the user equipment UE are: an interface 504 to the antenna 502 of the user equipment UE, a transceiver 506, a control part 510 of the user equipment UE, an interface 512 to the battery 514, and a user interface comprising a display 500, a keyboard 508, a microphone 516 and a speaker 518.

Figure 2A:
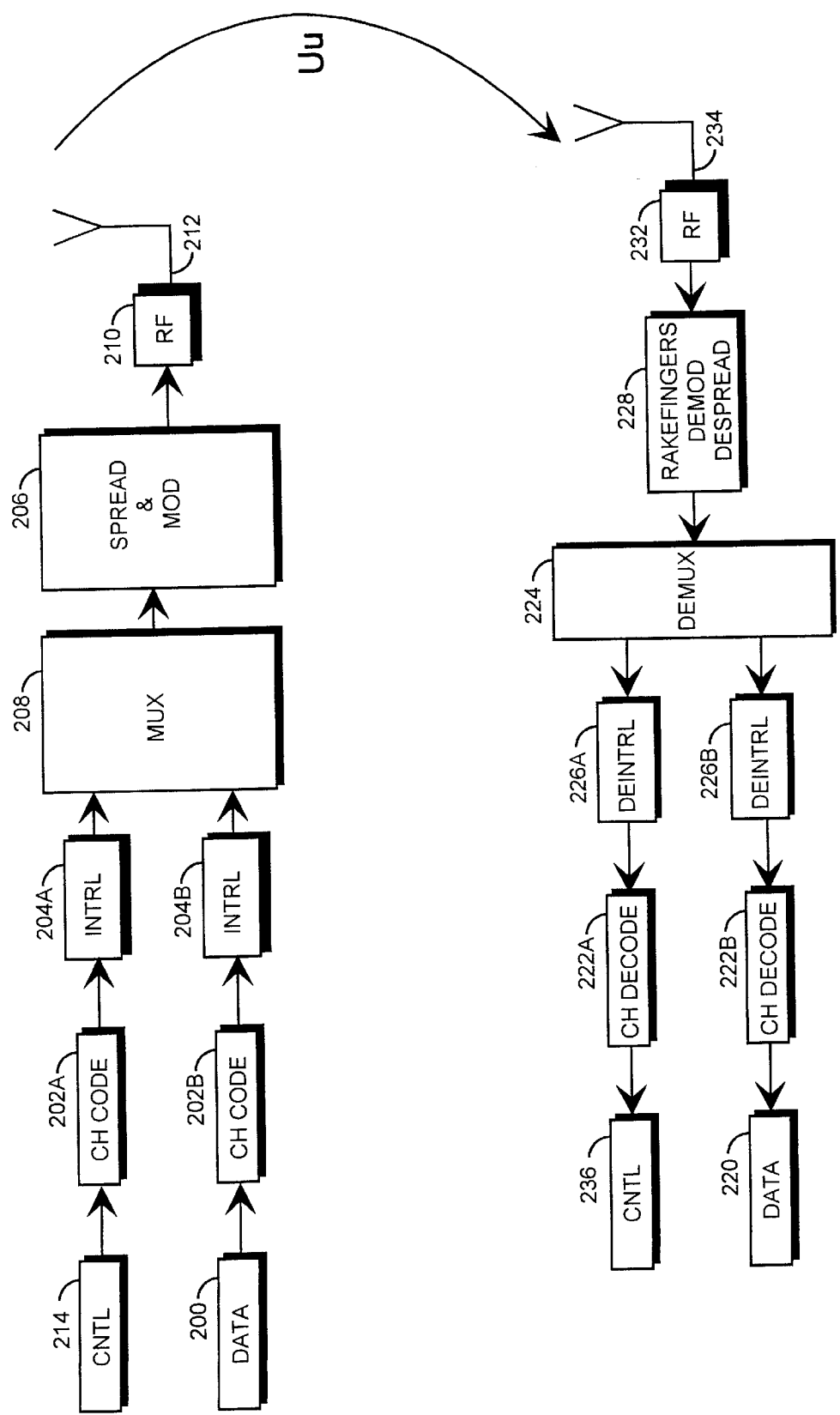
FIG. 2A illustrates a transmitter and a receiver.

FIG. 2A illustrates the functioning of a radio transmitter-radio receiver pair. The radio transmitter may be located in the node B or in the user equipment. Correspondingly the radio receiver may be located in the user equipment or in the node B.

The upper portion of FIG. 2A illustrates the essential functionality of the radio transmitter. Different services placed in a physical channel are e.g. speech, data, moving video, or still video picture, and the control channels of the system that are processed in the control part 214 of the radio transmitter. The control part 214 is related to the control of the equipment itself and to the control of the connection. FIG. 2A illustrates manipulation of the control channel and data 200. Different services call for different source encoding equipment, for example speech calls for a speech codec. Source encoding equipment is, however, not presented for the sake of clarity in FIG. 2A.

Different channels are then channel encoded in blocks 202A and 202B. One form of channel coding are different block codes, of which one example is cyclic redundancy check, or CRC. Another typical way of performing channel coding is convolutional coding and its different variations e.g. punctured convolutional coding and turbo coding.

Having been channel encoded, the channels are interleaved in an interleaver 204A, 204B. The object of interleaving is to make error correction easier. In interleaving, the bits are mixed with each other in a predetermined fashion, so that a transitory fading in the radio path does not necessarily make the transferred information unidentifiable. Different signals are multiplexed in block 208 in order to be sent using the same transmitter.

Figure 2B:
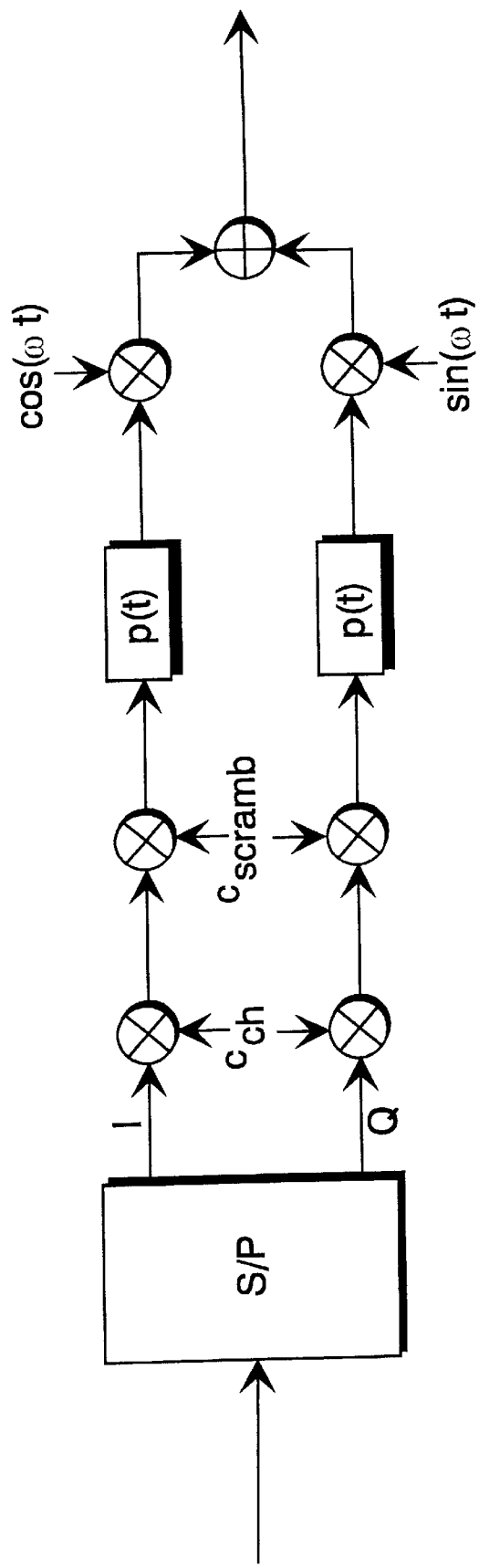
FIG. 2B illustrates spreading and modulation carried out in the transmitter.

Then the interleaved bits are spread with a spreading code, scrambled with a scrambling code and modulated in block 206, whose operation is described in detail in FIG. 2B.

Finally the combined signal is conveyed to the radio frequency parts 210, which may comprise power amplifiers and bandwidth restricting filters. Analog radio signal is then transmitted through an antenna 212 to the radio path Uu.

The lower portion of FIG. 2A illustrates the typical functionality of a radio receiver. The radio receiver is typically a Rake receiver. The analog radio signal is received from the radio path Uu by an antenna 234. The received signal is conveyed to radio frequency parts 232 that comprise a filter which blocks frequencies outside the desired frequency band. A signal is then converted in a demodulator 228 into an intermediate frequency or directly into baseband, and in this form the signal is sampled and quantized.

Because the signal in question is a multipath propagated signal, efforts are made to combine the signal components propagated in different multipaths in block 228 which comprises several Rake fingers.

In the so-called rowing Rake finger, the delays for the different multipath propagated signal components are searched. After the delays have been found, different Rake fingers are allocated for receiving each of its multipath propagated signals by correlating the received signal with the used spreading code delayed with the found delay of that particular multipath. The different demodulated and despread multipaths of the same signal are then combined in order to get a stronger signal.

The received physical channel is then demultiplexed in a demultiplexer 224 into data streams of different channels. The channels are then directed each to a de-interleaver 226A, 226B, wherein the received physical channel is then de-interleaved. After that physical channels are handled in a specific channel decoder 222A, 222B, wherein the channel coding used in the transmission is decoded. Convolutional coding is advantageously decoded with a Viterbi decoder. Each sent channel 220A, 220B, can be further processed, for example by transferring the data 220 to the computer 122 connected with the user equipment UE. The control channels of the system are conveyed to the control unit 236 of the radio receiver.

FIG. 2B illustrates in more detail spreading of the channel with the spreading code and the scrambling code, and modulation of the channel. In FIG. 2B from left comes the bit stream of the channel into the block S/P, wherein serial to parallel conversion is carried out for each two bit sequences, whereby one bit is conveyed into the I branch of the signal and the other bit is conveyed into the Q branch of the signal. Then the I and the Q branches of the signal are multiplied with the same spreading code $c_{ch}$, whereby relatively narrow-band information is spread into a wide frequency band. Each radio connection Uu has its own spreading code with which the receiver recognizes the transmissions meant for itself. Then the signal is scrambled by multiplying it with the scrambling code $c_{scramb}$ that is different for each user equipment and each base station. The pulse form of the produced signal is filtered with a filter p(t). Finally the signal is modulated into a radio frequency carrier by multiplying the different branches with a carrier. There is a 90 degree phase shift between the carriers of the different branches. The branches are then combined into one carrier which is ready to be sent into the radio path, excluding possible filtrations and power amplifications. The described modulation is QPSK (Quadrature Phase Shift Keying).

Figure 4:
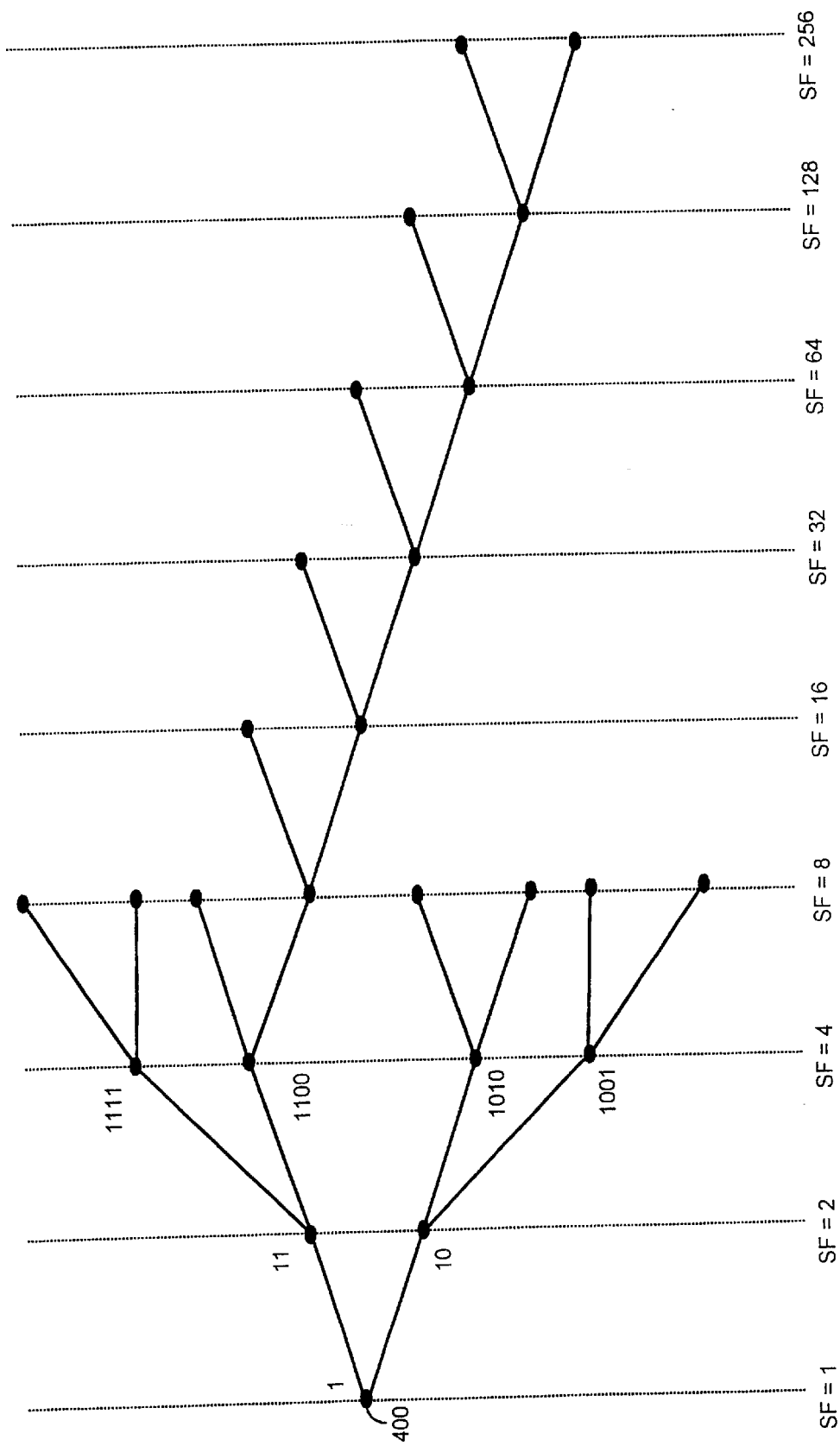
FIG. 4 illustrates a part of a spreading code tree.

In FIG. 4 examples of different spreading codes are illustrated. Each dot 400 represents one possible spreading code. The vertical broken lines represent different spreading factors (SF) SF=1, SF=2, SF=4, SF=8, SF=16, SF=32, SF=64, SF=128, SF=256. The codes being located on the vertical broken line are mutually orthogonal. Two hundred fifty-six mutually orthogonal spreading codes can then maximally exist. For example in the UMTS, when a 4.096 megachip carrier is used, the spreading factor SF=256 corresponds to a transmission rate of about 32 kilobits/second. Correspondingly, the highest usable transmission rate of 2048 kbit/s is achieved with the spreading code having the spreading factor SF=4. The transmission rate that the user obtains depends on the channel coding used, e.g. while using ⅓ convolutional coding the transmission rate visible to the user is about one third of the actual transmission rate of the channel. The spreading factor may indicate the length of the spreading code. For example the spreading code (1) corresponds with the spreading factor SF=1. On the spreading factor level SF=2 there are two mutually orthogonal spreading codes (1,1) and (1,0). The spreading factor level SF=4 has four mutually orthogonal spreading codes (1,1,1,1), (1,1,0,0), (1,0,1,0) and (1,0,0,1). So the formulation of the spreading codes is continued while traveling towards the lower levels of the code tree. The spreading codes at a certain spreading factor level are usually mutually orthogonal, e.g. in Walsh-Hadamard code sets.

Figure 3:
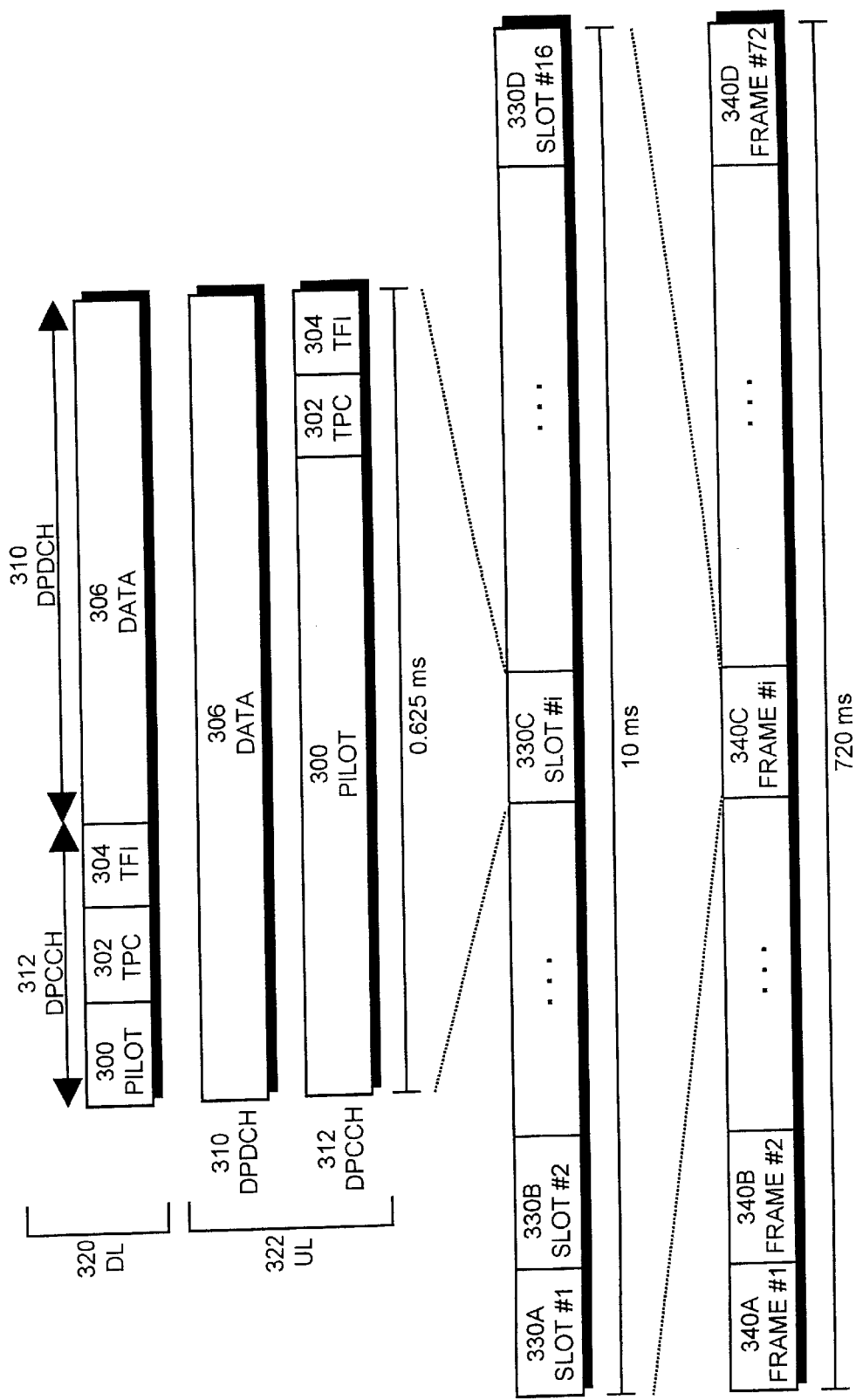
FIG. 3 illustrates a frame structure.

FIG. 3 shows an example of a possible frame structure used in the physical channel. Frames 340A, 340B, 340C, 340D are given a running number from one to seventy-two, and they form a 720 millisecond long super frame. The length of one frame 340C is ten milliseconds. The frame 340C is divided into sixteen slots 330A, 330B, 330C, 330D. The length of slot 330C is 0.625 milliseconds. One slot 330C corresponds typically with one power control period during which power is adjusted e.g. one decibel up or down.

The physical channels are divided into different types, including common physical channels and dedicated physical channels. The dedicated physical channels consist of dedicated physical data channels (DPDCH) 310 and dedicated physical control channels (DPCCH) 312. DPDCHs 310 are used to carry data 306 generated in layer two and above of the OSI (Open Systems Interconnection) model, i.e. dedicated control channels and dedicated traffic channels. DPCCHs 312 carry the control information generated in layer one of the OSI model. Control information comprises: pilot bits 300 used in channel estimation, transmit power-control commands (TPC) 302, and optionally transport format indicator (TFI) 304. TFI 304 tells the receiver the transport formats of different transport channels, i.e. Transport Format Combination, used in the current frame. Transport Format is a set of parameters, including the current transmission rate.

As can be seen from FIG. 3, down-link DPDCHs 310 and DPCCHs 312 are time multiplexed into the same slot 330C. Conversely, in the up-link, the channels are sent in parallel so that they are IQ/code multiplexed (I=in-phase, Q=quadrature) into each frame 340C and they are sent by using dual-channel quadrature phase-shift keying modulation. When additional DPDCHs 310 are to be sent, they are code multiplexed into the I or Q branch of the first channel pair.

Figure 8:
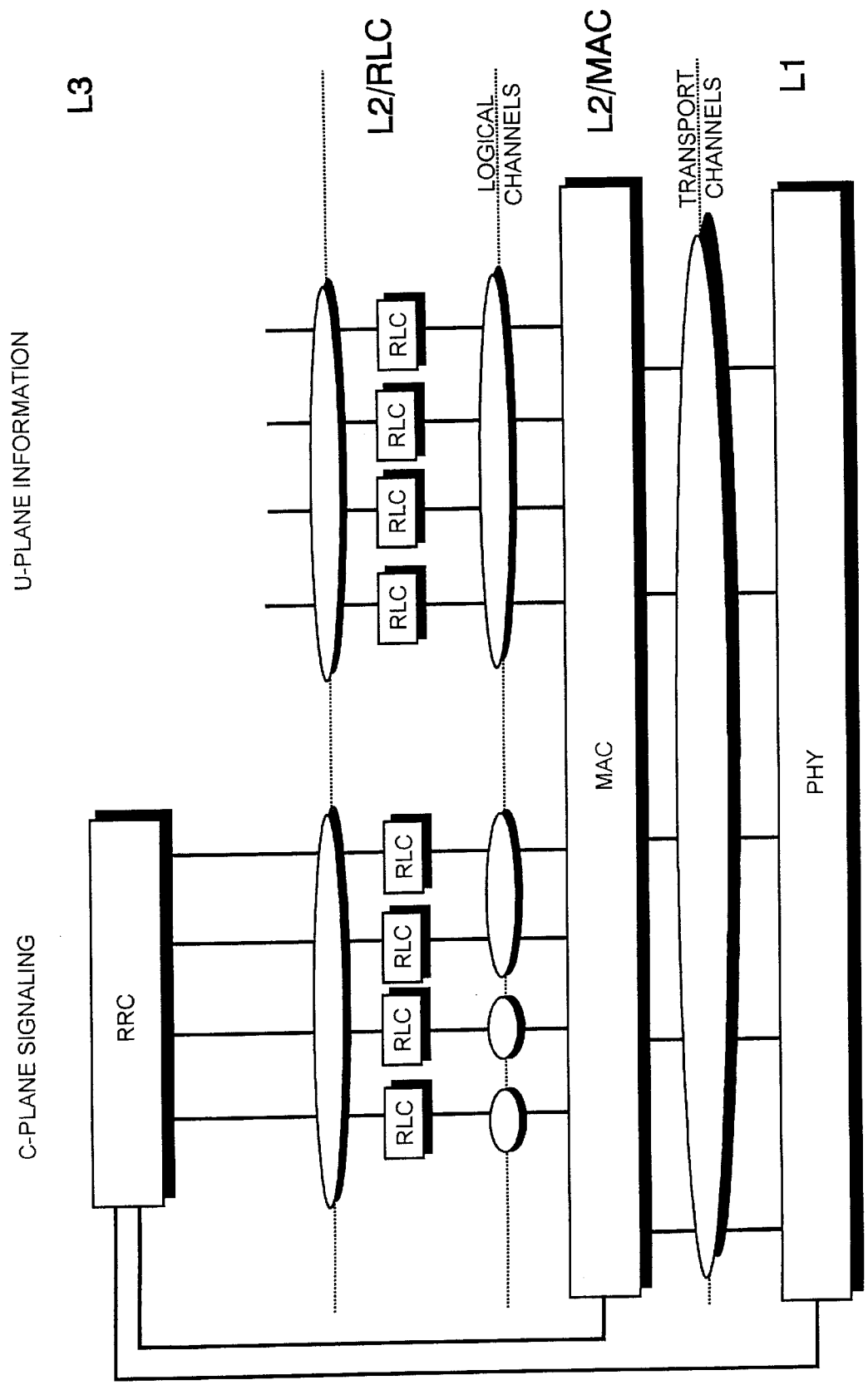
FIG. 8 illustrates a protocol stack.

The channels in the radio interface Uu are handled according to a protocol architecture comprising, according to the ISO (International Standardization Organization) OSI (Open Systems Interconnection) model, three protocol layers: a physical layer (=layer one), a data link layer (=layer two), and a network layer (=layer three). The other layers of the OSI model are not interesting from the invention's point of view. The protocol stacks are located both in the radio network subsystem RNS and in the user equipment UE. FIG. 8 illustrates the layers of the protocol architecture. The oval circles between different sublayers indicate service access points (SAP).

The physical layer L1 offers different transport channels to the MAC sub-layer MAC and higher layers. The physical layer transport services are described by how and with what characteristics data is transferred over the radio interface. The transport channels include Random Access Channel (RACH), Forward Access Channel (FACH), Broadcast Channel (BCH), Paging Channel (PCH), and Dedicated Channel (DCH). The physical layer L1 maps transport channels with physical channels. In the FDD (Frequency Division Duplex) mode a physical channel is characterized by the code, frequency and in the reverse link the relative phase (I/Q). In the TDD (Time Division Duplex) mode the physical channel is also characterized by the time slot.

The data link layer is divided into two sub-layers: a MAC sub-layer (Medium Access Control) and a RLC sub-layer (Radio Link Control). The MAC sub-layer L2/MAC offers different logical channels to the RLC sub-layer L2/RLC. The logical channel is characterized by the type of information that is transferred. This service provides unacknowledged transfer between peer MAC entities. One of the functions of the MAC sub-layer is to select the appropriate transport format for each transport channel depending on the momentary source bit rate.

The third layer L3 has a RRC sub-layer (Radio Resource Control) that handles the control plane signaling of layer three between the user equipment and the network. One of the functions carried out by the RRC sub-layer is assignment, reconfiguration and release of radio resources for the RRC connection. So the RRC sub-layer handles the assignment of radio resources required for the RRC connection, including requirements from both the control and user plane. The RRC layer may reconfigure radio resources during an established RRC connection.

Now in this invention we are interested in the mapping of the different services of one user to the same dedicated channel. According to the known technique each service has at its disposal a predetermined amount of the capacity of the dedicated channel reserved for that user.

Figure 6:
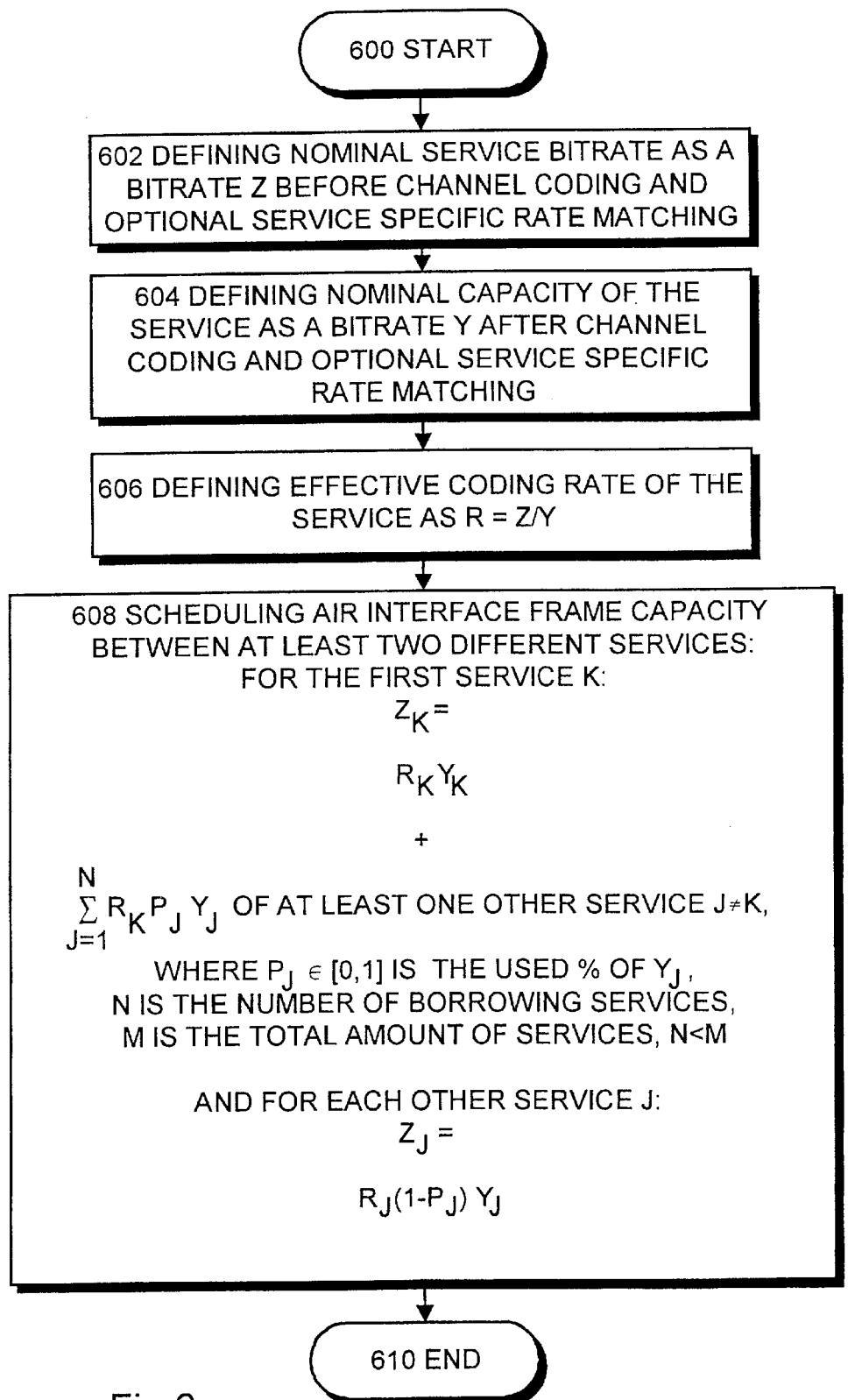
FIG. 6 is a flow diagram illustrating the method of scheduling air interface capacity.

The method according to the invention for scheduling air interface capacity between services of a user in a radio system is presented in FIG. 6. The performance of the method begins in block 600. Basically, a user should have at least two concurrent services in order to be able to utilize this method. The term service applies here also to control information e.g. RRC control information, therefore the control information can also be scheduled according to the method of the invention.

In block 602 a nominal service bit rate is defined as a bit rate Z before channel coding and service specific rate matching. This is the actual bit rate allocated for the service. It should be noted here that the service specific rate matching can be an optional feature, i.e. nominal service bit rate is defined as a bit rate before channel coding only. Typically channel coding is convolutional coding, and service specific rate matching is repetition coding or puncturing.

In block 604 a nominal capacity of the service is defined as a bit rate Y after channel coding and service specific rate matching. This is the needed air interface transmission capacity for a given service. As with the previous step also in this step the service specific rate matching is optional, i.e. nominal capacity of the service is defined as a bit rate after channel coding.

In block 606 an effective coding rate R of the service is defined by dividing the nominal service bit rate by the nominal capacity of the service, i.e. $R=Z/Y$.

The functionality of the blocks 602, 604. 606 is performed for every service that the user uses. The word "nominal" refers to a normal situation, i.e. service bit rates required by a given service in a normal or standard situation. The coding rate is chosen on the basis of the bit error rate requirements for the service and the current radio interface conditions. The nominal capacity required will be calculated on the basis of the required channel coding and the service bit rate.

In an normal situation the nominal capacities of the services will be used. In practice some services do not need to transmit all the time and in some services higher than nominal service bit rates may be generated occasionally. This is especially true for applications that use packet switched transmission, e.g. World Wide Web browser software. It would be a waste of resources to always allocate the needed theoretical maximum capacity to the user. If some service is not transmitted at all, then the free radio resource can be used for transmitting some other service.

Priorities can also be defined between services, e.g. the first service has a higher priority than the other service, and consequently the first service can always borrow the capacity of the other service, if needed, even if the capacity of the other service is not free. In principle, capacity cannot be borrowed from a real-time speech service, but if discontinuous transmission is used, the speech service can lend its capacity on a frame basis.

If the user's total allocated capacity is at all times too scarce, then more total capacity should be allocated instead of using the presented method.

In block 608, scheduling is carried out for an air interface frame by scheduling available capacity between at least two different services. First the capacity of the first service is computed by multiplying the nominal capacity of the first service K by the effective coding rate of the first service. The borrowed extra capacity of at least one other service is then added to said normal capacity of the first service, the extra capacity being computed by multiplying a predetermined amount of the nominal capacity of the other service J by the effective coding rate of the first service:

$$Z_K = R_K Y_K + \sum_{J=1}^{N} R_K P_J Y_J \quad (1)$$

where $P_j \in [0,1]$ is the free % of $Y_j$,

N is the number of borrowing services, and

M is the total amount of services, and N<M.

Service K can therefore lend capacity from a number of services, the maximum being M−1 other services. It can lend all capacity of some service, or only some portion of it. In an extreme case service K lends the whole capacity of all other services.

The bit rate of each other service can be computed by multiplying the remaining nominal capacity of the other service by the effective coding rate of the other service:

$$Z_j = R_j(1-P_j)Y_j \quad (2)$$

The method of the invention can be implemented, for example, in the RRC sub-layer and MAC sub-layer. The transport format indicator (it can also be called rate indicator or transport format combination indicator) is used to indicate the mixture of services used in the frame. Selection of the appropriate transport format for each transport channel depends on the amount of data in transmission buffers. Given the transport format combination set, assigned by layer three e.g. RRC sub-layer, MAC sub-layer selects the appropriate transport format within an assigned transport format set for each active transport channel depending on amount of data in the transmission buffers. Control of transport formats ensures efficient use of transport channels. A transport format combination set refers to all combinations of transport formats of different services.

In basic case the bit rate combination of different services in the air interface frame is signaled to the recipient by the transport format indicator. One service can borrow the capacity of some other service as previously presented. The ratio between the capacities of different services may be freely definable but this presupposes more signaling, i.e. the multiplexing structure has to be signaled for every frame. Another way to implement the invention is to only allow predetermined capacity combinations of different services in the air interface frame and to reserve one TFI word for each such service combination. Then only transport format indicator needs to be used as the recipient has in its microprocessor's memory the stored information telling which transport format indicator value corresponds to which multiplexing structure of the services.

Still another way is to use a blind detection algorithm in the receiver to determine the capacity combination used in the received air interface frame. This can be implemented in many ways, one exemplary way is to define a rule saying that the borrowing is possible in some predetermined sections, e.g. in sections being 100 bit long. The receiver finds the right combination by utilizing the blind detection algorithm. This solution has the advantage that the signaling of the multiplexing structure is not necessarily needed.

Next, an elaborated example illustrating the scheduling method is explained in connection with FIGS. 7A, 7B, 7C, 7D. Only some of the possibilities for scheduling will be illustrated, but it will be clear for a person skilled in the art how scheduling can be performed for a different number of services and with different scheduling ratios.

Figure 7B:
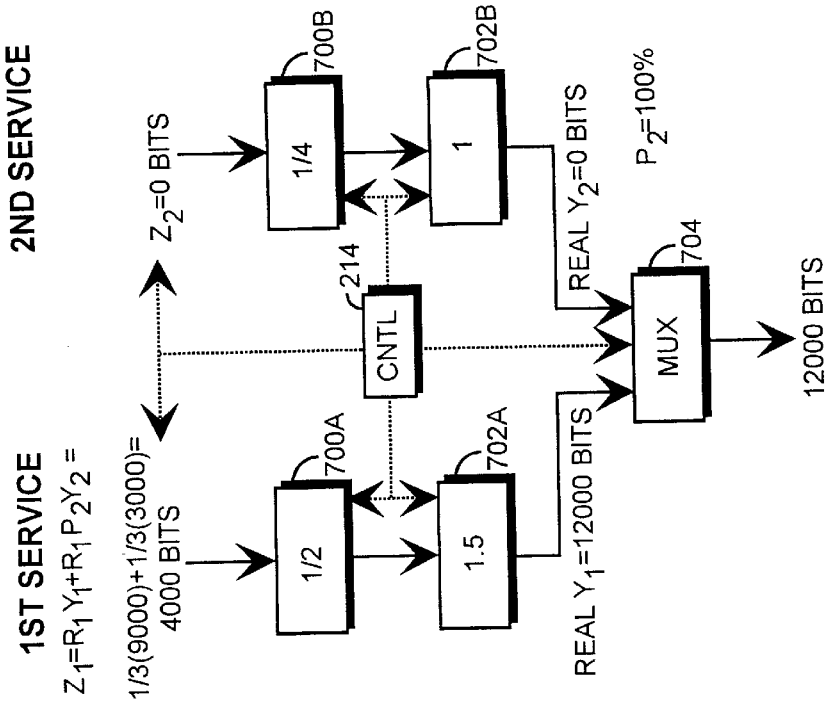
FIGS. 7A, 7B, 7C, 7D illustrate an example of the scheduling method.
Figure 7A:
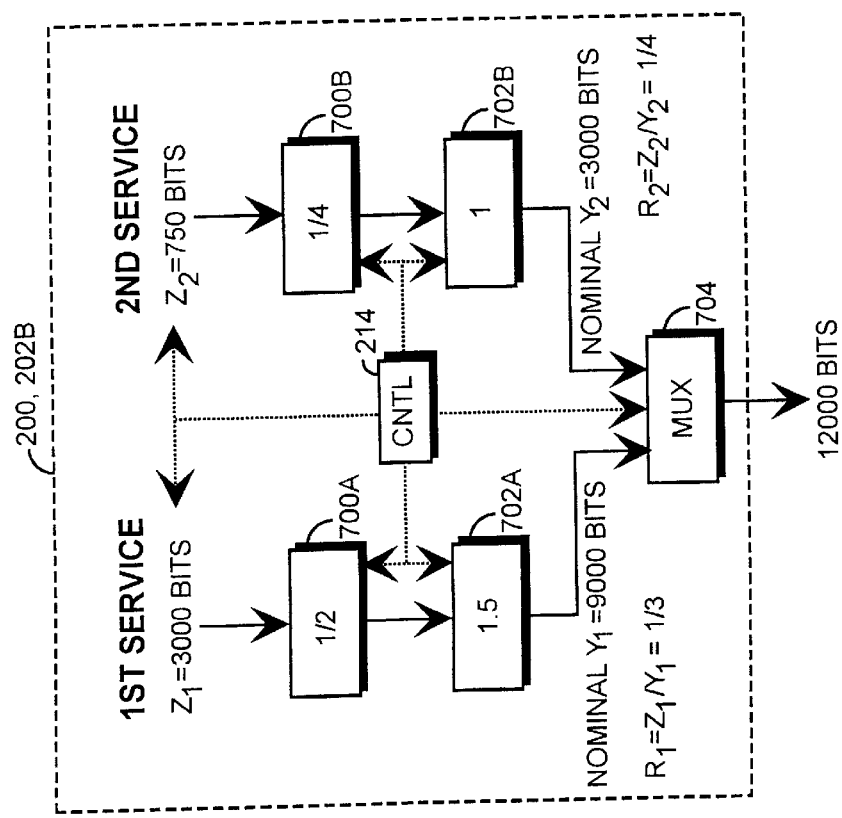

FIG. 7A illustrates the data 200 and the channel coding 202B of FIG. 2A. Let us assume that the user uses two services, the first service having a nominal service bit rate $Z_1$ of 3000 bits, and the second service having a nominal service bit rate $Z_2$ of 750 bits. Let us further assume e.g. that the bit error rate requirement for the first service is BER$10^{-3}$, the used channel coding consequently being only ½ convolutional coding performed in a channel coder 700A, but a service specific rate matching with 1.5 repetition coding also being performed in a rate matcher 702A. The required BER of the second service is $10^{-6}$, the channel coding consequently being heavier, i.e. the ¼ convolutional coding, but no service specific rate matching will be done, whereby the multiplier is one in block 702B. After the required channel coding and service specific rate matching, the nominal transmission capacity required is $Y_1$=9000 bits for the first service and $Y_2$=3000 bits for the second service. The coding rate of the first service is $R_1=Z_1/Y_1=\frac{1}{3}$ and the coding rate of the second service is $R_2=Y_2/Z_2=\frac{1}{4}$.

The multiplexing block 704 multiplexes the coded bit streams of the services in some specific way into one bit stream. The total capacity required is 12000 bits. The user can use these 12000 bits maximally at any given time. Typically one spreading code is reserved for the user, whereby the same transmission power is used for the bits of the first and second service, but the channel coding and service specific rate matching can be different, depending on the BER requirements.

The control unit 214 controls the blocks that are connected to it with a broken arrow-headed line. The invention is preferably implemented by software, but also ASIC (Application Specific Integrated Circuit) or some other HW implementation is of course possible. The channel coder 700A, 700B, the rate matcher 702A, 702B, the means 214 for defining a nominal service bit rate, the means 214 for defining a nominal capacity of the service, the means 214 for defining an effective coding rate of the service, the means 214 for scheduling for an air interface frame the capacity between at least two different services, the means 214 for computing the bit rate of the first service, the means 214 for adding the borrowed extra capacity of the other service to this normal bit rate of the first service, and the means 214 for computing the bit rate of the other service can consequently be software modules of the protocol stack residing in the user equipment UE, and in the radio network subsystem RNS.

FIG. 7A illustrates the required nominal capacities that may be used in a normal situation. In FIG. 7B the first service may use the entire nominal capacity of the second service, i.e. $Z_2$=0 bits, real $Y_2$=0 bits, and real $Y_1$=12000 bits. The allowed service bit rate of the first service can be computed: $Z_1=R_1Y_1+R_1P_2Y_2=\frac{1}{3}(9000)+\frac{1}{3}(1*3000)=4000$ bits.

Figures 7C, 7D:
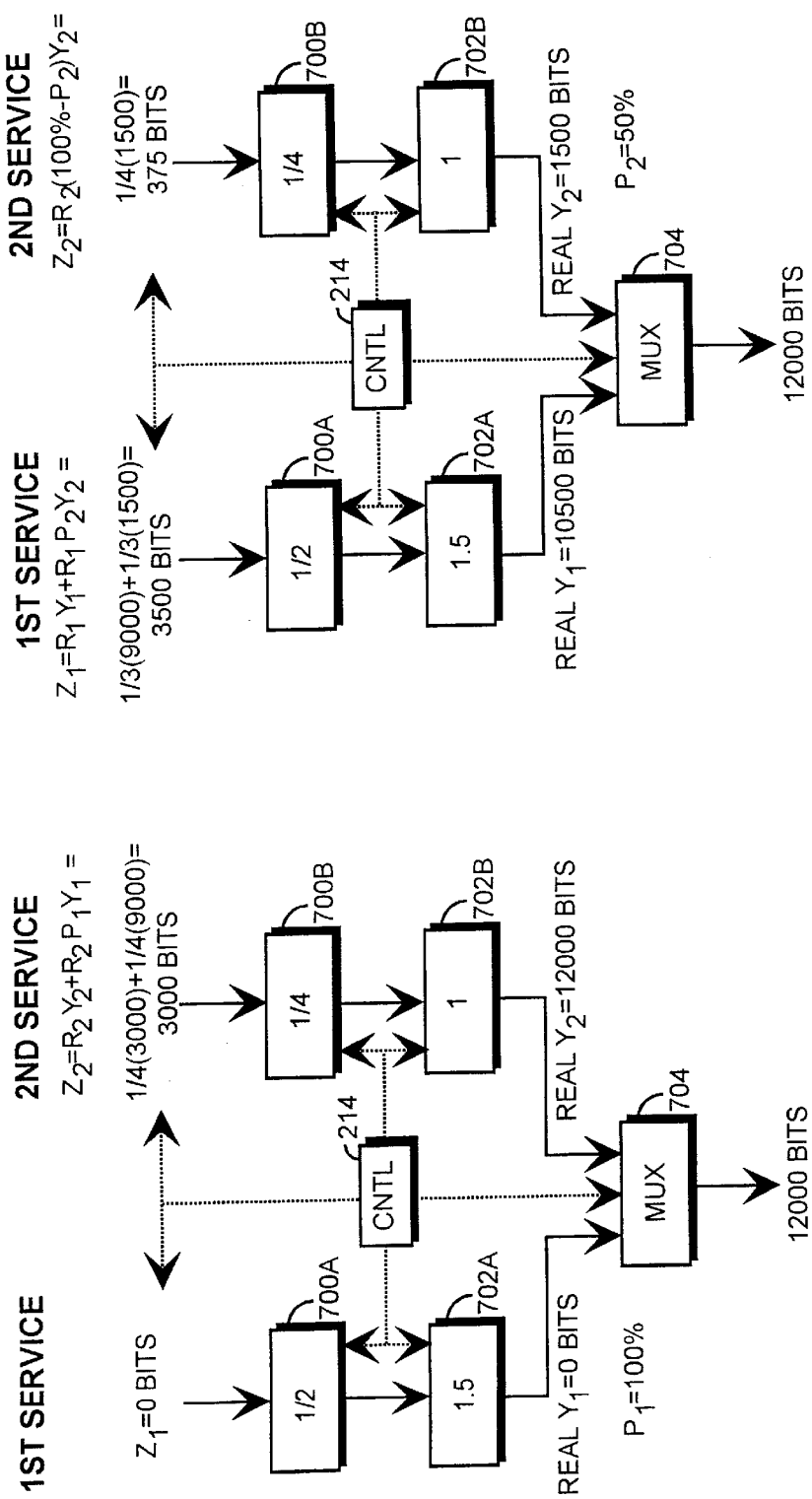

In FIG. 7C the situation is reversed: the second service may now use the entire nominal capacity of the first service, i.e. $Z_1=0$ bits, real $Y_1=0$ bits, and real $Y_2=12000$ bits. The allowed service bit rate of the second service can be computed: $Z_2=R_2Y_2+R_2P_1Y_1=\frac{1}{4}(3000)+\frac{1}{4}(1*9000)=3000$ bits.

In FIG. 7D the first service has borrowed from the second service 50% of its capacity, i.e. the real $Y_1=9000+0.5*3000=10500$ bits and the real $Y_2=0.5*3000=1500$ bits. The service bit rate of the first service is $Z_1=R_1Y_1+R_1P_2Y_2=\frac{1}{3}(9000)+\frac{1}{3}(0.5*3000)=3500$ bits. The service bit rate of the second service is $Z_2=R_2(1-P_2)Y_2=\frac{1}{4}(0.5*3000)=375$ bits.

Even though the invention is described above with reference to an example shown in the attached drawings, it is apparent that the invention is not restricted to it, but can vary in many ways within the inventive idea disclosed in the attached claims.

What is claimed is:

1. A method of scheduling air interface capacity between user services in a radio system, comprising:
   defining a nominal service bit rate as a bit rate before channel coding and service specific rate matching;
   defining a nominal capacity of the service as a bit rate after channel coding and service specific rate matching;
   defining an effective coding rate of the service by dividing the nominal service bit rate by the nominal capacity of the service; and
   scheduling air interface frame capacity between at least two different user services, including:
      computing the bit rate of a first service by multiplying the nominal capacity of the first service by the effective coding rate of the first service, and
      adding to this normal bit rate of the first service borrowed extra capacity of at least one other service, the bit rate obtained from the extra capacity computed by multiplying a predetermined amount of the nominal capacity of the other service by the effective coding rate of the first service.

2. A method of scheduling air interface capacity between user services in a radio system, comprising:
   defining a nominal service bit rate as a bit rate before channel coding;
   defining a nominal capacity of the service as a bit rate after channel coding;
   defining an effective coding rate of the service by dividing the nominal service bit rate by the nominal capacity of the service; and
   scheduling air interface frame capacity between at least two different user services, including:
      computing the bit rate of a first service by multiplying the nominal capacity of the first service by the effective coding rate of the first service, and
      adding to this normal bit rate of the first service borrowed extra capacity of at least one other service, the bit rate obtained from the extra capacity computed by multiplying a predetermined amount of the nominal capacity of the other service by the effective coding rate of the first service.

3. A method according to claim 1, wherein the borrowed extra capacity is an unused part of the nominal capacity of the other service.

4. A method according to claim 1, wherein the first service has a higher priority than the other service.

5. A method according to claim 1, wherein a capacity combination of different services in the air interface frame is signaled to a recipient.

6. A method according to claim 1, wherein allowed capacity combinations of different services in the air interface frame are predetermined.

7. A method according to claim 6, wherein a receiver uses a blind detection algorithm to determine the capacity combination used in the received air interface frame.

8. A method according to claim 1, wherein the bit rate of the other service is computed by multiplying remaining nominal capacity of the other service by the effective coding rate of the other service.

9. A radio transmitter for transmitting information of at least two different user services, comprising:
   a channel coder in each service information branch for coding the information;
   a rate matcher connected to the output of the channel coder in each service information branch for performing service specific rate matching for the information;
   means for defining a nominal service bit rate as a bit rate before channel coding and service specific rate matching;
   means for defining a nominal capacity for the service as a bit rate after channel coding and service specific rate matching;
   means for defining an effective coding rate for the service by dividing the nominal service bit rate by the nominal capacity of the service; and
   means for scheduling air interface frame capacity between at least two different user services, including:
      means for computing the bit rate of a first service by multiplying the nominal capacity of the first service by the effective coding rate of the first service, and
      means for adding to this normal bit rate of the first service borrowed extra capacity of at least one other service, the bit rate obtained from the extra capacity computed by multiplying a predetermined amount of the nominal capacity of the other service by the effective coding rate of the first service.

10. A radio transmitter for transmitting information of at least two different user services, comprising:
    a channel coder in each service information branch for coding the information;
    means for defining a nominal service bit rate as a bit rate before channel coding;
    means for defining a nominal capacity for the service as a bit rate after channel coding;
    means for defining an effective coding rate for the service by dividing the nominal service bit rate by the nominal capacity of the service; and
    means for scheduling air interface frame capacity between at least two different user services, including:
       means for computing the bit rate of a first service by multiplying the nominal capacity of the first service by the effective coding rate of the first service, and
       means for adding to this normal bit rate of the first service borrowed extra capacity of at least one other service, the bit rate obtained from the extra capacity computed by multiplying a predetermined amount of the nominal capacity of the other service by the effective coding rate of the first service.

11. A radio transmitter according to claim 9, wherein the means for scheduling uses an unused part of the nominal capacity of the other service as the borrowed extra capacity.

12. A radio transmitter according to claim 9, wherein the means for scheduling recognizes that the first service has a higher priority than the other service.

13. A radio transmitter according to claim 9, further comprising means for signaling a capacity combination of different services in the air interface frame to a recipient.

14. A radio transmitter according to claim 9, further comprising means for storing predetermined allowed air interface frame capacity service combinations.

15. A radio transmitter according to claim 14, further comprising a blind detection algorithm to determine which capacity combination was used in the received air interface frame.

16. A radio transmitter according to claim 9, further comprising means for computing the bit rate of the other service by multiplying remaining nominal capacity of the other service by the effective coding rate of the other service.

17. A method according to claim 2, wherein the borrowed extra capacity is an unused part of the nominal capacity of the other service.

18. A method according to claim 2, wherein the first service has a higher priority than the other service.

19. A method according to claim 2, wherein a capacity combination of different services in the air interface frame is signaled to a recipient.

20. A method according to claim 2, wherein allowed capacity combinations of different services in the air interface frame are predetermined.

21. A method according to claim 20, wherein a receiver uses a blind detection algorithm to determine the capacity combination used in the received air interface frame.

22. A method according to claim 2, wherein the bit rate of the other service is computed by multiplying remaining nominal capacity of the other service by the effective coding rate of the other service.

23. A radio transmitter according to claim 10, wherein the means for scheduling uses an unused part of the nominal capacity of the other service as the borrowed extra capacity.

24. A radio transmitter according to claim 10, wherein the means for scheduling recognizes that the first service has a higher priority than the other service.

25. A radio transmitter according to claim 10, further comprising means for signaling a capacity combination of different services in the air interface frame to a recipient.

26. A radio transmitter according to claim 10, further comprising means for storing predetermined allowed air interface frame capacity service combinations.

27. A radio transmitter according to claim 26, further comprising a blind detection algorithm to determine which capacity combination was used in the received air interface frame.

28. A radio transmitter according to claim 10, further comprising means for computing the bit rate of the other service by multiplying remaining nominal capacity of the other service by the effective coding rate of the other service.

\* \* \* \* \*